(12) United States Patent
Sakuma et al.

(10) Patent No.: US 11,048,040 B2
(45) Date of Patent: Jun. 29, 2021

(54) OPTICAL FIBER

(71) Applicant: SUMITOMO ELECTRIC INDUSTRIES, LTD., Osaka (JP)

(72) Inventors: Hirotaka Sakuma, Osaka (JP); Yoshiaki Tamura, Osaka (JP); Keisei Morita, Osaka (JP); Yuki Kawaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/849,449

(22) Filed: Apr. 15, 2020

(65) Prior Publication Data
US 2020/0249393 A1    Aug. 6, 2020

Related U.S. Application Data

(63) Continuation of application No. 16/386,534, filed on Apr. 17, 2019, now Pat. No. 10,656,329.

(30) Foreign Application Priority Data

Apr. 20, 2018    (JP) .............................. JP2018-081479

(51) Int. Cl.
*G02B 6/036* (2006.01)
*G02B 6/02* (2006.01)
(Continued)

(52) U.S. Cl.
CPC ............ *G02B 6/036* (2013.01); *C03B 37/014* (2013.01); *C03B 37/01446* (2013.01);
(Continued)

(58) Field of Classification Search
CPC .............. G02B 6/02266; G02B 6/0281; G02B 6/0365; G02B 6/03627; G02B 6/03694;
(Continued)

(56) References Cited

U.S. PATENT DOCUMENTS 4,704,151 A * 11/1987 Keck ..................... C03B 37/028
65/402
2004/0057253 A1* 3/2004 DeCusatis .............. G02B 6/425
362/581
(Continued)

FOREIGN PATENT DOCUMENTS

EP    3246736 A1    11/2017
JP    2009-541796 A    11/2009
(Continued)

*Primary Examiner* — Michael P Mooney
(74) *Attorney, Agent, or Firm* — Faegre Drinker Biddle & Reath LLP (57) ABSTRACT

The optical fiber offered is capable of not only restraining the attenuation due to glass defects, but also reducing the increase of manufacturing cost. The optical fiber is made of silica glass and includes a core and a cladding. The cladding encloses the core and has a refractive index smaller than that of the core. When the core is divided into inner core and outer core at half of the radius of the core, the average chlorine concentration of the inner core is larger than that of the outer core. The core includes any of the alkali metal group.

19 Claims, 5 Drawing Sheets

(51) Int. Cl.
*G02B 6/028* (2006.01)
*C03C 13/04* (2006.01)
*C03C 3/06* (2006.01)
*C03B 37/014* (2006.01)

(52) U.S. Cl.
CPC ............... *C03C 3/06* (2013.01); *C03C 13/04* (2013.01); *C03C 13/045* (2013.01); *C03C 13/046* (2013.01); *G02B 6/02* (2013.01); *G02B 6/02009* (2013.01); *G02B 6/0281* (2013.01); *G02B 6/02266* (2013.01); *G02B 6/03694* (2013.01)

(58) Field of Classification Search
CPC .............. G02B 6/02019; G02B 6/4204; C03B 37/01446; C03C 3/06; C03C 13/045; C03C 13/046; G02F 1/133514; B29C 64/00
USPC .................................................. 385/123–128
See application file for complete search history.

(56) References Cited

U.S. PATENT DOCUMENTS

| | | |
|---|---|---|
| 2004/0190834 A1* | 9/2004 | Bush .................... G02B 6/2555 385/50 |
| 2004/0240814 A1 | 12/2004 | Boek et al. |
| 2014/0241684 A1 | 8/2014 | Bookbinder et al. |
| 2015/0098682 A1 | 4/2015 | Tamura et al. |
| 2018/0362392 A1* | 12/2018 | Sakuma ............ C03B 37/01225 |
| 2019/0016630 A1 | 1/2019 | Morita et al. |

FOREIGN PATENT DOCUMENTS

| | | |
|---|---|---|
| JP | 2017-76053 A | 4/2017 |
| WO | WO 2007/149344 A1 | 12/2007 |
| WO | WO 2008024255 A2 | 2/2008 |
| WO | WO 2015/079987 A1 | 6/2015 |
| WO | WO 2017/164025 A1 | 9/2017 |

* cited by examiner

| | Attenuation at 1550nm [dB/km] | Inner core Average Cl concentration A [ppm by mass] | Outer core Average Cl concentration B [ppm by mass] | Core Average Cl concentration | Cl concentration ratio A/B | Core Average K concentration [ppm by mass] | Core diameter [μm] | Cutoff wavelength [nm] | Effective area [μm2] |
|---|---|---|---|---|---|---|---|---|---|
| A | 0.149 | 1600 | 500 | 780 | 3.2 | 20 | 14.0 | 1470 | 148 |
| B | 0.151 | 1000 | 500 | 630 | 2.0 | 18 | 13.9 | 1510 | 151 |
| C | 0.152 | 800 | 500 | 580 | 1.6 | 19 | 13.6 | 1460 | 155 |
| D | 0.154 | 400 | 500 | 480 | 0.8 | 21 | 14.1 | 1480 | 152 |
| E | 0.158 | 100 | 500 | 400 | 0.2 | 20 | 13.7 | 1440 | 148 |
| F | 0.154 | 500 | 500 | 500 | 1.0 | 20 | 14.1 | 1470 | 148 |
| G | 0.151 | 500 | 700 | 650 | 0.7 | 21 | 13.8 | 1490 | 150 |
| H | 0.149 | 500 | 1000 | 880 | 0.5 | 20 | 13.9 | 1500 | 152 |
| I | 0.148 | 500 | 1300 | 1100 | 0.4 | 20 | 13.5 | 1460 | 155 |
| J | 0.155 | 600 | 100 | 230 | 6.0 | 19 | 13.8 | 1490 | 150 |
| K | 0.172 | 1000 | 500 | 630 | 2.0 | 0 | 13.8 | 1500 | 147 |

OPTICAL FIBER

FIELD OF THE INVENTION

The present disclosure relates to an optical fiber.

BACKGROUND ART

Generally, if alkali metal element or alkaline-earth-metal element is contained in the core of an optical fiber preform consisting of silica glass, the attenuation caused by Rayleigh scattering of an optical fiber will decrease because the viscosity of the core is reduced and the re-arrangement of glass is facilitated while the optical fiber preform is drawn into the optical fiber. Hereinafter, both of the alkali metal element and the alkaline-earth-metal element are called the "alkali metal group."

If the core which contains an alkali metal group does not contain chlorine (or contains only low concentration of chlorine), the attenuation will be increased because glass defects occur as the connection in glass molecular structure is broken when the alkali metal group elements added to the central part of the core in the state of optical fiber preform spread during fiber-drawing. If the core contains sufficient quantity of chlorine, the attenuation caused by glass defects will decrease because the occurrence of glass defects is restrained as the chlorine connects with the alkali metal group.

In order to reduce the increase of attenuation caused by such glass defect, the core of optical fibers disclosed in JP 2009-541796A (Patent Document 1) and JP 2017-76053A (Patent Document 2) contains chlorine in addition to the alkali metal group. When the core is divided into inner core and outer core in the optical fiber disclosed by Patent Document 1, the chlorine concentration of the inner core is 0 to 100 mol ppm, and the chlorine concentration of the outer core is 500 mol ppm or more. In the optical fiber disclosed by Patent Document 2, the chlorine concentration of the inner core is 0 to 1000 mol ppm, and that of the outer core is 4000 mol ppm or more.

In either of Patent Documents 1 and 2, the chlorine concentration of the inner core is smaller than that of the outer core. Thus, it is thought that the increase of the attenuation due to glass defects can be restrained if the chlorine concentration of the inner core in which the alkali metal group is added is made lower to control crystallization while the chlorine concentration of the outer core is made higher to restore the glass defect caused during fiber-drawing.

SUMMARY OF THE INVENTION

Means for Solving a Problem

The optical fiber of the present disclosure is made of silica glass and includes a core and a cladding. The core has a radius of $r_0$ and contains an alkali metal or an alkaline-earth-metal element. The cladding encloses the core and has a refractive index smaller than that of the core. The core includes an inner core having radius of $r_0/2$ and an outer core having inside radius of $r_0/2$ and an outside radius of $r_0$. The average chlorine concentration of the inner core is larger than that of the outer core.

DETAILED DESCRIPTION OF THE INVENTION

The cost for manufacturing an optical fiber will increase if the chlorine concentration of the outer core is made larger than that of the inner core according to the invention disclosed in Patent Documents 1 and 2.

Hereinafter, embodiments of the present invention will be described in detail with reference to the drawings. In the drawings, the same mark is applied to an identical part, and the duplication of explanation is avoided. The present invention should not be limited to the embodiments, and the invention is shown by the scope of claims. It is intended that all modifications within the meaning and scope of equivalents to the claims should be included in the scope of the invention.

Figure 1:
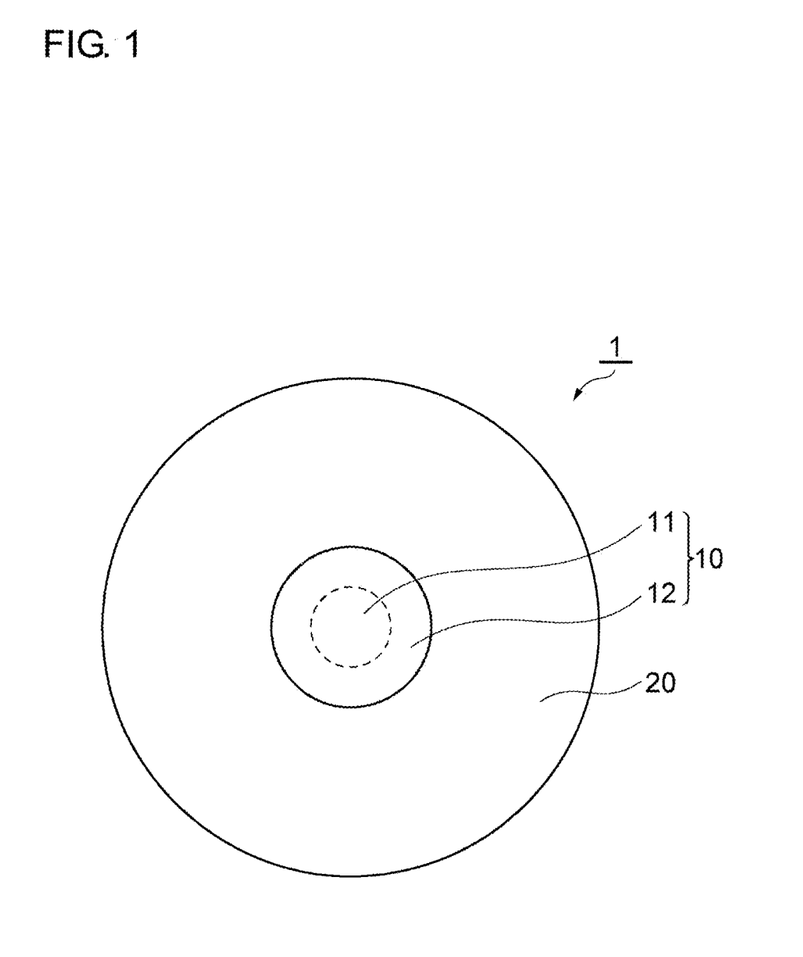
FIG. 1 shows a cross-section of an optical fiber of the present disclosure.

FIG. 1 shows a cross-section of the optical fiber 1 of the present disclosure. The optical fiber 1 is made of silica glass and includes a core 10 and a cladding 20. The cladding 20 encloses the core 10 and has a refractive index smaller than that of the core 10. The core 10 includes any of the alkali metal group, and when the core 10 is divided into an inner core 11 and an outer core 12 at one half of the radius of the core 10, the average chlorine concentration of the inner core 11 is larger than that of the outer core 12.

The fact that the average chlorine concentration of the inner core 11 is larger than that of the outer core 12 means that the chlorine concentration is also large in the domain where the concentration of the alkali metal group is large. Therefore, it is possible to restrain the increase of attenuation caused by glass defects resulting from diffusion of the alkali metal group, and further more the increase of hydrogen loss can be controlled. Thus, the increase in manufacturing cost as well as the increase of attenuation due to glass defects can be restrained with respect to the optical fiber 1.

In the optical fiber 1, the rate of change of chlorine concentration in the radial direction of the core 10 is preferably not more than −10 ppm by mass per 1 μm. The rate of change of the chlorine concentration in the radial direction is defined as a slope of a linear function which approximates the chlorine concentration. The slope is determined by the least-squares method. Preferably, the average chlorine concentration of the inner core 11 is from 100 ppm by mass to 2000 ppm by mass. Preferably, the average chlorine concentration of the outer core 12 is from 100 ppm by mass to 2000 ppm by mass.

In the optical fiber 1, A/B, which is the ratio of the average chlorine concentration A of the inner core 11 to the average chlorine concentration B of the outer core 12, is preferably larger than 1.5, and more preferably larger than 2.0.

In the optical fiber 1, the core 10 preferably contains fluorine. It is possible to reduce viscosity by adding fluorine to the core, and thereby the attenuation can be lowered. Preferably, the average fluorine concentration in the core 10 is 500 to 5000 ppm by mass. If the fluorine is not added 500 ppm by mass or more, the viscosity will not sufficiently decrease and the attenuation cannot be reduced. On the other hand, if the fluorine is added 5000 ppm by mass or more, the reduction of attenuation cannot be achieved because the attenuation increment due to concentration fluctuation exceeds the attenuation reduction obtained by the decrease of viscosity.

In the optical fiber 1, the average concentration of the alkali metal group in the core 10 is preferably 0.2 to 200 ppm by mass. It is desirable that the average concentration of alkali metal group be 0.2 ppm by mass or more in order to reduce the attenuation at the wavelength of 1550 nm to 0.160 dB/km or less. The average concentration of the alkali metal group is preferably 200 ppm by mass or less in order to restrain the occurrence of crystallization. As for the alkali metal group, preferably the core 10 contains one or more elements selected from a group consisting of sodium, potassium, rubidium, cesium, and calcium.

In the optical fiber 1, the number of propagation mode at the wavelength of 1550 nm is preferably one. In such case, the optical fiber can perform a single mode operation at the wavelength of 1550 nm. Moreover, the number of propagation mode at the wavelength of 1550 nm may be two or more. In such case, the optical fiber can be used for optical transmission in a band around the wavelength of 1550 nm.

Figure 2:
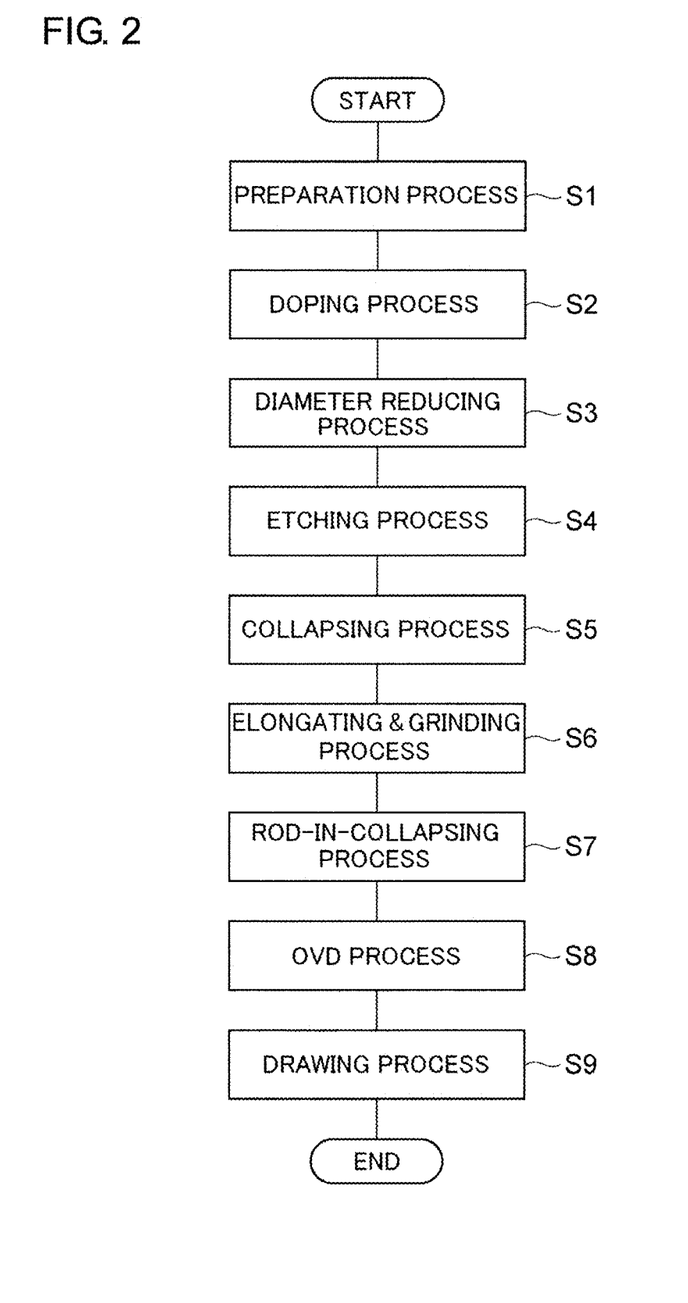
FIG. 2 is a flow-chart for explaining a method of manufacturing the optical fiber of FIG. 1.

FIG. 2 is a flow chart which explains a method for manufacturing an optical fiber. In the following, an explanation is described about an example of concrete conditions. An optical fiber is produced through the following processes: Preparation process (Step S1), Doping process (Step S2), Diameter reducing process (Step S3), Etching process (Step S4), Collapsing process (Step S5), Elongating & grinding process (Step S6), Rod-in-collapsing process (Step S7), OVD process (Step S8), and Drawing process (Step S9) in the enumerated order.

At the preparation process (Step S1), a silica glass pipe into which alkali metal elements (dopant), etc. are to be doped is prepared. The silica glass rod from which the silica glass pipe is formed contains a certain concentration of chlorine and fluorine of 500 to 5000 ppm by mass, and the concentration of the other dopants and impurities is 10 ppm by mass or less. The outer diameter of this silica glass pipe is 30 to 40 mm, and the inner diameter is 15 to 25 mm. Since the chlorine concentration is different in each of optical fibers produced therefrom, the average chlorine concentration of the core in the state of optical fiber is summarized separately in the below-mentioned table. The concentration herein mentioned is a concentration defined by formula (1) in the case of fluorine concentration, for example:

$$\frac{2\int_0^c F(r) \cdot r \cdot dr}{c^2}, \quad (1)$$

where F(r) represents the fluorine concentration at the position of radius r. The letter "c" represents the radius of a silica glass rod from which a glass pipe is formed.

The silica glass rod, from which the glass pipe is formed, is made through processes in the enumerated order, for example: soot deposition by Vapor phase axial deposition (VAD) method, dehydration, and consolidation. In such case, $Cl_2$ and $SiCl_4$ are used as supply gas during the dehydration, and the chlorine added during the dehydration will be vaporized to dissipate through the surface of soot or glass during the consolidation, so that the chlorine concentration of the outer side decreases. In order to control such dissipation, or in order to add further to achieve higher concentration, it is necessary to continue supplying the chlorine-based gas during the consolidation. This will increase the amount of gas to be used, resulting in higher cost.

At the doping process (Step S2), a potassium (K) element as a dopant of the alkali metal group is added to the inner surface of the silica glass pipe. Potassium bromide (KBr) of 6 to 10 g is used as a material. This material is heated to a temperature of 750° C. to 850° C. with an outside heat source so as to generate the vapor of material. While introducing the material-vapor into the inside of the silica glass pipe together with a carrier gas consisting of oxygen having a flow of 1 SLM (1 liter/min as converted under normal conditions), the silica glass pipe is heated from outside by an oxy-hydrogen burner so that the outer surface of the glass pipe may have a temperature of 1600° C. to 1800° C. In such case, the burner is traversed at a speed of 30 to 60 mm/min for a total of 10 to 15 turns so as to achieve the heating, and thereby the inner surface of the silica glass pipe is diffused with the K element.

At the diameter reducing process (Step S3), the diameter of the K-added silica glass pipe decreases. In such case, while oxygen of 0.5 to 1.0 SLM is flowed inside the silica glass pipe, the silica glass pipe is heated by an outside heat source so that its outer surface may have a temperature of 2000° C. to 2300° C. The outside heat source is traversed in total 6 to 10 turns for heating until the silica glass pipe has an inner diameter of 3 to 6 mm, and thereby the diameter reducing is achieved.

In the etching process (Step S4), the etching is performed on the inside face of the silica glass pipe. In such case, a vapor-phase etching is performed by heating the silica glass pipe with an outside heat source while introducing the mixed gas of $SF_6$ (0.2 to 0.4 SLM) and chlorine (0.5 to 1.0 SLM) into the inside of the silica glass pipe. In this way, the inside face of the pipe which contains a high concentration of impurities added with the intended dopants can be cut off and thereby the impurities can be removed.

At the collapsing process (Step S5), the silica glass pipe is collapsed to be a solid body. In such collapsing, the silica glass pipe 30 is collapsed by making the temperature of the surface to be 2000° C. to 2300° C. while introducing a mixed gas of oxygen (0.1 to 0.5 SLM) and helium (0.5 to 1.0 SLM) into the inside of the silica glass pipe and decompressing the absolute pressure inside the silica glass pipe to 97 kPa or less. By such collapsing, a core part (outer diameter: 20 to 30 mm) is obtained as a rod. A core layer which does not contain the alkali metal, etc. may be applied on the outside of the rod by a well-known method, such as outside vapor deposition (OVD) method or a collapsing method.

At the elongating & grinding process (Step S6), the core part is elongated to have a diameter of 20 to 25 mm, and further its perimeter is grinded so that the diameter may be 15 to 20 mm. This part will become the core of an optical fiber. At a half of the radius of the core part, the core part is divided into an inner core part which includes the central axis and an outer core part which does not include the central axis. The profile of chlorine concentration of the core part is defined by the average chlorine concentration of the inner core part and that of the outer core part, and a plurality of core parts were made as shown in the following table. Here, the average chlorine concentration of the inner core part is expressed by the following formula (2):

$$\frac{2\int_0^{r_i} Cl(r)\cdot r\cdot dr}{r_i^2}. \quad (2)$$

The average chlorine concentration of the outer core part is expressed by the following formula (3):

$$\frac{2\int_{r_i}^{r_0} Cl(r)\cdot r\cdot dr}{r_0^2 - r_i^2}, \quad (3)$$

where Cl (r) means the chlorine concentration at a position of radius r. The radius of the core part is $r_0$, and $r_i=r_0/2$. For example, if the radius of the core part is 7 μm, the boundary position is located at radius of 3.5 μm. The core part is defined as the portion which includes the central axis and whose minimum refractive index is higher than that of the whole optical fiber by 0.1% or more.

At the rod-in-collapsing process (Step S7), a first cladding part (i.e., a domain which has an outer diameter of about 3 to 5 times the mode filed diameter of the optical fiber and which has a significant effect for the attenuation) is provided on the outside of the core part. In such case, the rod-in-collapsing method is used: that is, the core part is inserted into the inside of the silica glass pipe to which fluorine is added, and both the core part and the pipe are unified to make a rod by heating with an outside heating source. The relative refractive index difference between the core part and the first cladding part is about 0.34% at the maximum. As a result of unification of the core part and the pipe by such rod-in-collapsing method, the amount of moisture of the core part and the neighboring first cladding part can be controlled to a sufficiently low level.

At the OVD process (Step S8), the rod made by unifying the core part and the first cladding part is elongated to have a given diameter, and thereafter a second cladding part containing fluorine is formed by the OVD method on the outside of the rod, so that an optical fiber preform is produced.

At the drawing process (Step S9), an optical fiber is produced by drawing an optical fiber preform made by the above-mentioned method for producing an optical fiber preform. The drawing speed is 1,800 m/min to 2,300 m/min, and the drawing tension is 0.5N.

Figure 3:
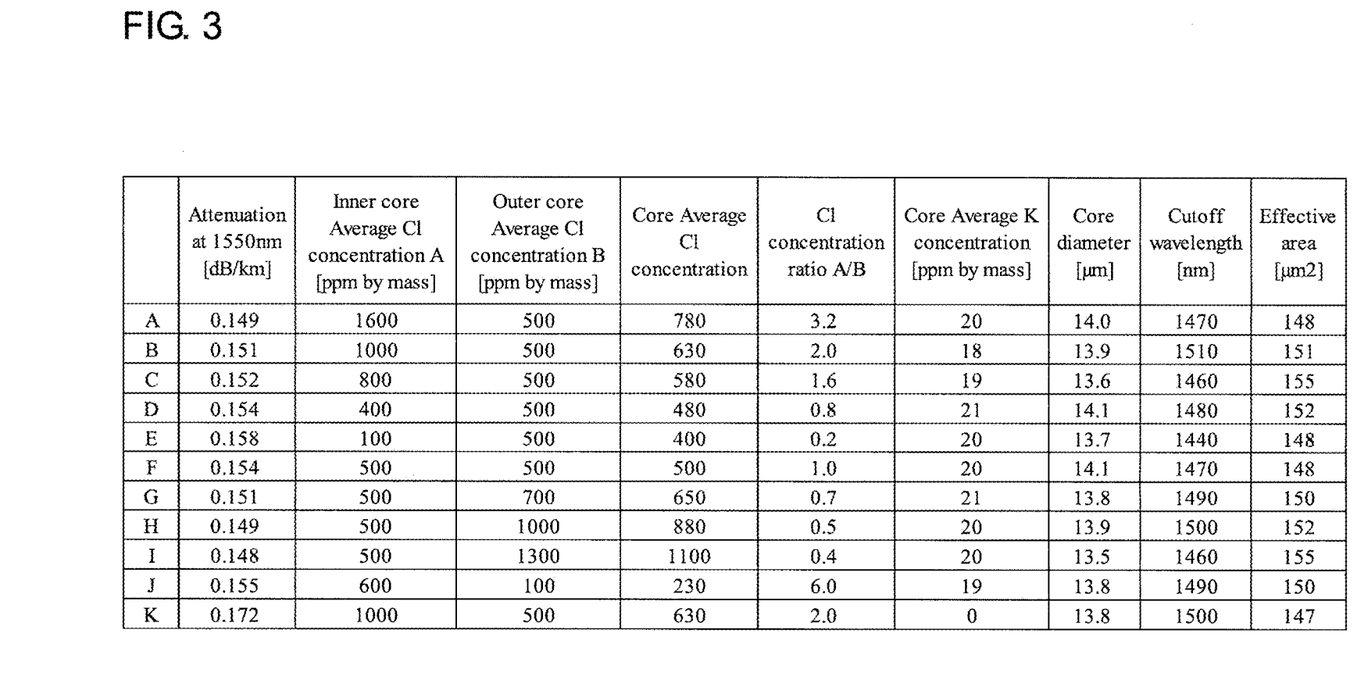
FIG. 3 is a table for summarizing the specifications of exemplary optical fibers A to K of FIG. 1.

FIG. 3 is a table showing the specifications for each of 11 sorts of optical fibers (A to K) which we manufactured and evaluated. Thus, the table shows attenuation at the wavelength of 1550 nm (dB/km), the average chlorine concentration A of inner core (ppm by mass), the average chlorine concentration B of outer core (ppm by mass), the average chlorine concentration (ppm by mass) of whole core, ratio A/B, the average potassium concentration of whole core, core diameter (μm), cutoff wavelength (nm), and effective area (μm²) at the wavelength of 1550 nm.

Figure 4:
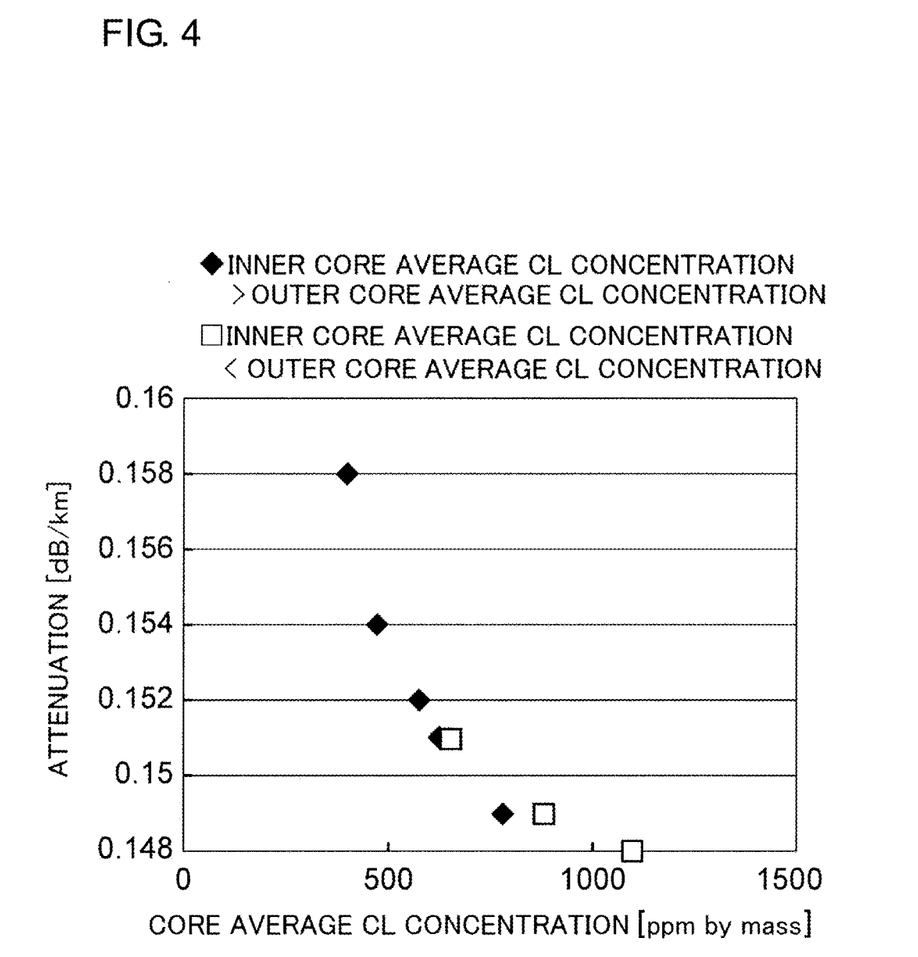
FIG. 4 is a graph in which the average chlorine concentration of the whole core and the attenuation at 1550 nm wavelength are plotted with respect to each of the optical fibers A to K.
Figure 5:
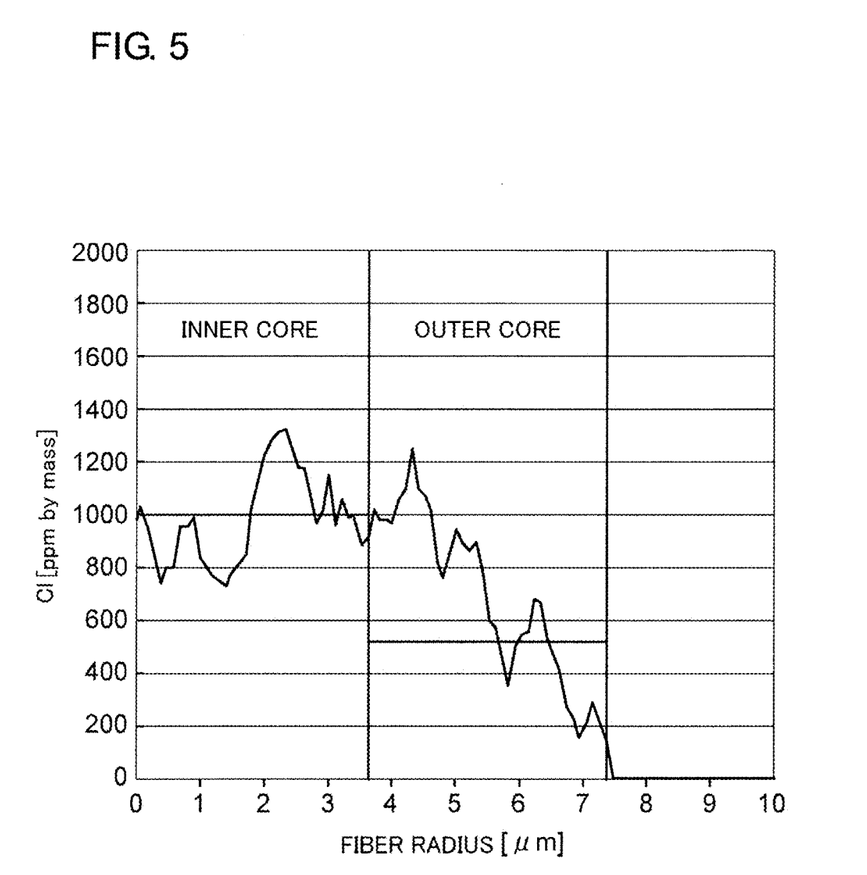
FIG. 5 is a graph showing a radial profile of chlorine concentration in the optical fiber B.

FIG. 4 is a graph for plotting the average chlorine concentration of the whole core and the attenuation at the wavelength of 1550 nm with respect to each of the optical fibers (A to K). In this figure, different plotting marks are used for A>B and A<B. FIG. 5 is a graph showing a radial profile of chlorine concentration in the optical fiber B. In optical fiber B, the average chlorine concentration of the inner core is about 1000 ppm by mass, and the average chlorine concentration of the outer core is about 500 ppm by mass. As a result of evaluation about each of optical fibers (A to K), the following can be held.

When the average chlorine concentration of the inner core or the outer core exceeded 2000 ppm by mass, there were cased in which crystallization occurred and the yield fell. When the average chlorine concentration of the outer core was about 500 ppm by mass and the average chlorine concentration of the inner core was changed to the range of 100 to 1600 ppm by mass (See optical fibers A to E), there is a tendency such that the attenuation is lower where the chlorine concentration is higher. When the average chlorine concentration A of the inner core is lower than the average chlorine concentration B of the outer core (Optical fibers F to I), the relations between the attenuation and the average chlorine concentration (the area average) of the whole core are almost comparable. Therefore, the higher the chlorine concentration of the inner core is, the more advantageous, because a low cost is required for making a vitreous body by the VAD method which is superior in terms of mass production.

Although the attenuation is dependent on the concentration of the alkali metal group contained in a core, it is held that the influence is small in the optical fibers A to K, for the concentration of the alkali metal group is unified by about 20 ppm by mass.

The attenuation is larger when the average chlorine concentration of the inner core or the outer core is less than 100 ppm by mass (Optical fibers E, J). Therefore, preferably the chlorine concentration of the whole core is not less than 100 ppm by mass so that the increase of the attenuation may be restrained. On the other hand, when the chlorine concentration exceeds 2000 ppm by mass, there is a case where crystallization occurs, resulting in failure of fiber-making.

What is claimed is:

1. An optical fiber made of silica glass and comprising:
   a core containing an alkali metal or an alkaline-earth-metal element and having a radius of $r_0$; and
   a cladding enclosing the core and having a refractive index smaller than that of the core, wherein the core includes an inner core having a radius of $r_0/2$ and an outer core having an inside radius of $r_0/2$ and an outside radius of $r_0$, and the average chlorine concentration of the inner core is larger than that of the outer core,
   wherein the rate of change of chlorine concentration in the radial direction of the core is not more than 10 ppm by mass per 1 μm.

2. An optical fiber as set forth in claim 1, wherein the average chlorine concentration of the inner core is from 100 ppm by mass to 2000 ppm by mass.

3. An optical fiber as set forth in claim 1, wherein the average chlorine concentration of the outer core is from 100 ppm by mass to 2000 ppm by mass.

4. An optical fiber as set forth in claim 1, wherein the ratio A/B of the average chlorine concentration A of the inner core to the average chlorine concentration B of the outer core is larger than 2.

5. An optical fiber as set forth in claim 1, wherein the core contains fluorine.

6. An optical fiber as set forth in claim 1, wherein the core contains one or more elements selected from a group consisting of sodium, potassium, rubidium, cesium, and calcium.

7. An optical fiber as set forth in claim 1,
wherein the number of propagation mode at the wavelength of 1550 nm is one.

8. An optical fiber as set forth in claim 1,
wherein the number of propagation mode at the wavelength of 1550 nm is two or more.

9. An optical fiber made of silica glass and comprising:
a core containing an alkali metal or an alkaline-earth-metal element and having a radius of $r_0$; and
a cladding enclosing the core and having a refractive index smaller than that of the core, wherein the core includes an inner core having a radius of $r_0/2$ and an outer core having an inside radius of $r_0/2$ and an outside radius of $r_0$, and the average chlorine concentration of the inner core is larger than that of the outer core,
wherein the average chlorine concentration of the inner core is from 100 ppm by mass to 2000 ppm by mass, and
wherein the ratio A/B of the average chlorine concentration A of the inner core to the average chlorine concentration B of the outer core is larger than 2.

10. An optical fiber as set forth in claim 9,
wherein the average chlorine concentration of the outer core is from 100 ppm by mass to 2000 ppm by mass.

11. An optical fiber as set forth in claim 9,
wherein the core contains fluorine.

12. An optical fiber as set forth in claim 9,
wherein the core contains one or more elements selected from a group consisting of sodium, potassium, rubidium, cesium, and calcium.

13. An optical fiber as set forth in claim 9,
wherein the number of propagation mode at the wavelength of 1550 nm is one.

14. An optical fiber as set forth in claim 9,
wherein the number of propagation mode at the wavelength of 1550 nm is two or more.

15. An optical fiber made of silica glass and comprising:
a core containing an alkali metal or an alkaline-earth-metal element and having a radius of $r_0$; and
a cladding enclosing the core and having a refractive index smaller than that of the core,
wherein the core includes an inner core having a radius of $r_0/2$ and an outer core having an inside radius of $r_0/2$ and an outside radius of $r_0$, and the average chlorine concentration of the inner core is larger than that of the outer core,
wherein the average chlorine concentration of the outer core is from 100 ppm by mass to 2000 ppm by mass, and
wherein the ratio A/B of the average chlorine concentration A of the inner core to the average chlorine concentration B of the outer core is larger than 2.

16. An optical fiber as set forth in claim 15,
wherein the core contains fluorine.

17. An optical fiber as set forth in claim 15,
wherein the core contains one or more elements selected from a group consisting of sodium, potassium, rubidium, cesium, and calcium.

18. An optical fiber as set forth in claim 15,
wherein the number of propagation mode at the wavelength of 1550 nm is one.

19. An optical fiber as set forth in claim 15,
wherein the number of propagation mode at the wavelength of 1550 nm is two or more.

\* \* \* \* \*